United States Patent [19]
Frank

[11] Patent Number: 6,002,765
[45] Date of Patent: Dec. 14, 1999

[54] HANDS-FREE TELEPHONE CRADLE

[75] Inventor: Christopher L. Frank, Emeryville, Calif.

[73] Assignees: Sony Corporation of Japan, Tokyo, Japan; Sony Electronics, Inc., Park Ridge, N.J.

[21] Appl. No.: 08/988,503

[22] Filed: Dec. 10, 1997

[51] Int. Cl.$^6$ .................................................... H04M 1/00
[52] U.S. Cl. ............................................ 379/446; 379/455
[58] Field of Search ................................ 379/446, 455, 379/454, 449, 426

[56] References Cited

U.S. PATENT DOCUMENTS 5,832,083  11/1998  Nagai ........................................ 379/446

FOREIGN PATENT DOCUMENTS

6-6434  1/1994  Japan ...................................... 379/426

*Primary Examiner*—Jack Chiang
*Attorney, Agent, or Firm*—Wagner, Murabito & Hao LLP

[57] ABSTRACT

A cradle for a telephone is disclosed. The telephone cradle includes a latch bar and a spring mechanism and a latching mechanism. The latch bar pivots so as to capture a telephone when the telephone is inserted into the cradle, thereby securely holding the telephone in the cradle. A user then may release the telephone by pressing on the top surface of the latch bar. As the user presses on the latch bar a latching mechanism is released and the latch bar moves into the released position, thereby moving the telephone so that it is easily grasped by a user.

12 Claims, 8 Drawing Sheets

HANDS-FREE TELEPHONE CRADLE

TECHNICAL FIELD

This invention relates to the field of communication devices. More particularly, the present invention relates to an improved cradle for a telephone.

BACKGROUND ART

As cellular telephones developed over the years, their size has steadily decreased. This has been partly due to the integration of many of the telephones electronic functions into semiconductor devices such as digital signal processors specifically designed to process the electrical operations of a cellular telephone. In addition, smaller, more powerful batteries have been developed. This has allowed cellular telephone makers to adopt one piece designs. In these one piece designs, all of the functions of the handset and the housing are integrated into a one-piece handheld unit.

Cellular telephones are used extensively within vehicles such as cars and trucks. Cradles for newer one-piece telephones typically attach to the vehicle and provide a secure receptacle to hold the telephone when it is not in use. Because all of the functions are integrated into the telephone itself, there are no electronic components disposed within the cradle and there is no connection between the cradle and the telephone as with older two piece designs.

Prior art cradles typically include latching mechanisms in order to hold the telephone securely in the cradle. This assures that there is a good electrical contact between the telephone and the cradle so as to allow for charging the telephone. The latching mechanism holds the telephone tightly in place, thereby assuring that the telephone will not fall out of the cradle.

Prior art latching mechanisms typically include one or more buttons which must be pressed in order to release the telephone. In one prior art cradle design, two buttons are located on either side of the cradle. In order to remove the telephone from the cradle, the user must press both buttons and lift the telephone out of the cradle. These buttons are relatively small and are located on opposite sides of the cradle. This requires two hands, one hand to press the two buttons and the other hand to remove the telephone from the cradle. In addition, the user must look down to see the location of the two buttons in order to press them. This makes removal of the telephone difficult if not impossible while the user is operating the vehicle.

Prior art cradle designs typically place the telephone directly against a receiving surface of the cradle. Because the user cannot get his hands around the telephone, when the user attempts to remove the telephone from the cradle, the telephone is difficult to grasp. The user typically must concentrate and use two hands to pry the telephone out of the cradle.

What is needed is a cradle for a cellular telephone which is easy to use. In addition, a cradle is needed which does not require the user to operate small buttons in order to remove the telephone from the cradle. A cradle which holds the telephone securely in place is also required. In addition, a need exists for a cradle which does not require the use of both hands during the removal of the telephone from the cradle. The present invention meets the above needs.

DISCLOSURE OF THE INVENTION

The present invention provides a cradle for a cellular telephone that is easy to use. A telephone may be easily be captured by the cradle and may be easily released such that one handed operation is possible.

A cradle for a telephone which includes a housing and a latch bar is disclosed. The latch bar is pivotally coupled to the housing such that the latch bar is movable from a latched position to a released position. The cradle also includes a latching mechanism and a spring mechanism. The latching mechanism holds the latch bar in the latched position. The spring mechanism is in tension when the latch bar is in the latched position so as to bias the latch bar in the released position.

In one embodiment, a user may easily release the latch by pressing on the top surface of the latch bar when the latch bar is in the latched position. This disengages the latching mechanism such that the spring mechanism acts on the latch bar so as to move the latch bar into the released position.

The cradle of the present invention is adapted to readily receive a telephone. The user may easily secure the telephone within the cradle by placing the telephone in the cradle and pressing down on the top of the telephone. This pivots the latch bar to a latched position such that the telephone is captured within the cradle. The telephone moves downward with the movement of the latch bar until such time as the latch bar pivots into the latched position. As the telephone reaches the latched position, the latching mechanism is engaged so as to hold the latch bar in the latched position. When the latch bar is in the latched position, the telephone is securely held within the cradle.

A user may easily remove the telephone from the telephone cradle by pressing down on the top surface of the latch bar so as to release the latching mechanism. The latch bar then automatically pivots into the released position, pushing the top of the telephone away from the surface of the cradle such that the telephone is released and is easily grasped by the user.

The cradle of the present invention is easy to use and allows for one handed operation. When the latch bar is in the latched position, the telephone is held securely within the cradle. In addition, there are no small buttons which must be operated as is required by prior art designs. Moreover, the top surface of the latch bar is large and is easy to see and feel. Therefore, the user does not have to concentrate and look down for an extended amount of time in order to find and operate the release mechanism. Further, the latch bar of the present invention is large enough such that the user can easily locate and operate the latch bar by touch only. That is, the present invention is able to be operated by a user without requiring the user to look at the cradle. Also, in the released position, one end of the telephone is raised so as to allow a user to easily grasp the telephone. This facilitates one handed operation since the user may easily grasp the telephone without having to concentrate and look down for an extended amount of time as is required in prior art designs.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
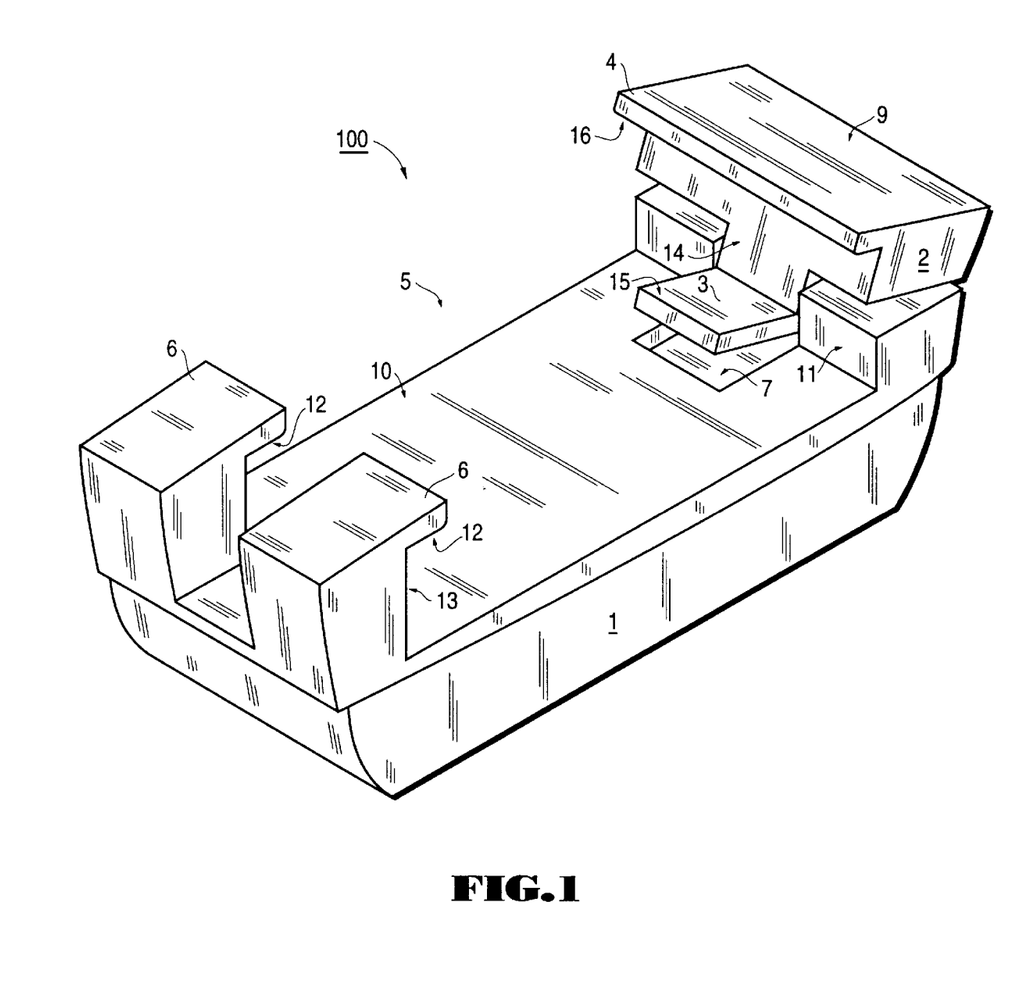
FIG. 1 is a perspective view of a cradle having a latch bar which is in the released position in accordance with the present invention.

FIG. 1 shows cradle 100 to include housing 1 and latch bar 2. Housing 1 is shown to include cavity 5 which is adapted to receive a telephone. More specifically, housing 1 includes telephone receiving surfaces 10–13 which are adapted to receive a telephone. The dimensions of cavity 5 are tailored to conform with different telephone designs such that a particular telephone fits within cavity 5. Alternatively, cradle 100 may be designed to receive multiple different telephone designs. Cradle 100 is formed of plastic and is adapted to be mounted within a vehicle. However, alternatively, cradle 100 may be formed of any of a number of other materials such as metals, composites, or other durable materials.

Continuing with FIG. 1, latch bar 2 is shown to be in the released position. In the present embodiment, latch bar 2 is shaped so as to include extending member 3 which extends from the bottom of latch bar 2 and a projecting member 4 which extends from the top of latch bar 2. In one embodiment, latch bar 2 is a single molded plastic part and extending member 3 and projecting member 4 are integrally formed within latch bar 2. In the embodiment shown in FIG. 1, indention 7 within housing 1 is adapted to receive extending member 3.

Figure 2:
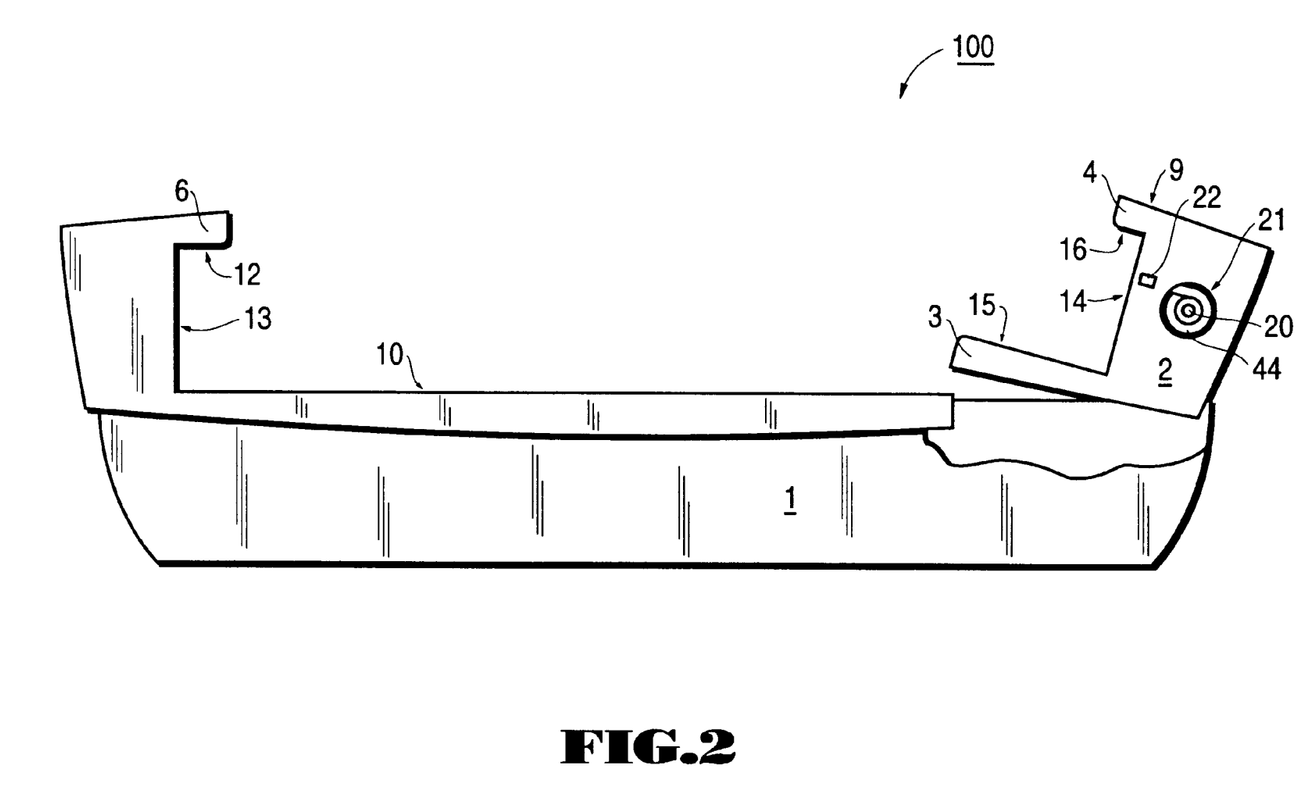
FIG. 2 is a side cut-away view of a cradle having a latch bar which is in the released position in accordance with the present invention.

Referring now to FIG. 2, in the released position, extending member 3 is at an angle relative to telephone receiving surface 10 such that the top surface of extending member 3, shown as telephone receiving surface 15, is at an angle relative to telephone receiving surface 10. In the present embodiment, the bottom surface of projecting member 4, shown as telephone receiving surface 16, is roughly parallel to telephone receiving surface 15. Latch bar 2 also includes telephone receiving surface 14 which, in conjunction with telephone receiving surfaces 15–16 forms roughly a u-shaped cavity adapted to receive a telephone.

With reference again to FIG. 2, pivot opening 21 extends through latch bar 2. Pivot pin 20 fits within pivot opening 21 and engages openings (not shown) in housing 1 so as to secure latch bar 2 to housing 1 such that latch bar 2 can pivot relative to housing 1. Cradle 100 includes a latching mechanism for holding latch bar 2 in the latched position. In one embodiment this latch mechanism includes detent 22 which extends from one side of latch bar 2 and a corresponding notch in housing 1. Detent 22 is adapted to engage the notch in housing 1 when latch bar 2 is in the latched position.

Although a specific latching mechanism is recited in the present embodiment, the present invention is well suited to using various other methods to secure latch bar 2 in a latched or closed position. For example, the present invention is well suited to an embodiment in which latch bar 2 is configured with a biasing mechanism such that it is stable only in the latched or in the released position. In such an embodiment, latch bar 2 will move to an open position when no telephone is inserted, but will remain in a closed position when a telephone is inserted and is pressed downward.

Figure 3:
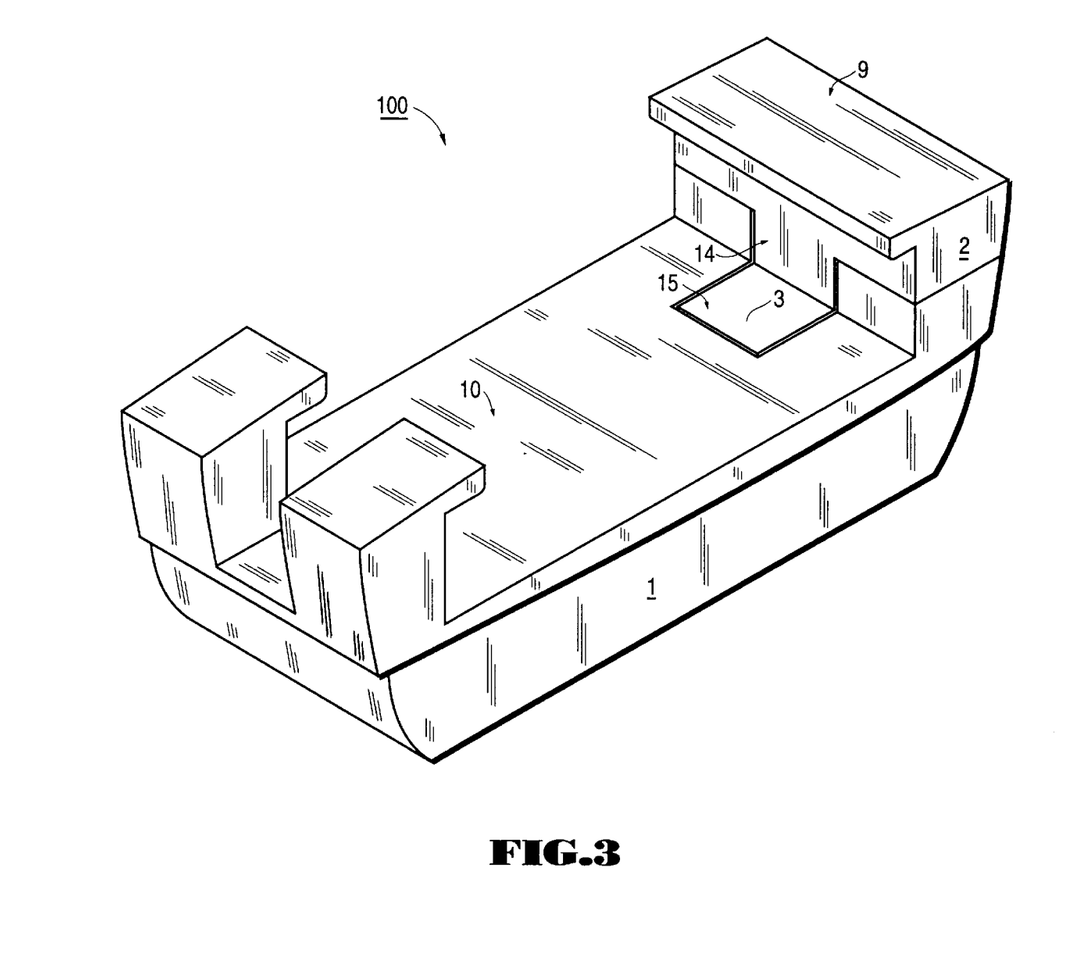
FIG. 3 is a perspective view of a cradle having a latch bar which is in the latched position in accordance with the present invention.

Referring next to FIG. 3, in the latched position, extended member 3 fits within indentation 7 of FIG. 1 such that telephone receiving surface 15 is roughly aligned with telephone receiving surface 10. This gives a relatively uniform surface for receiving a telephone.

Figure 4:
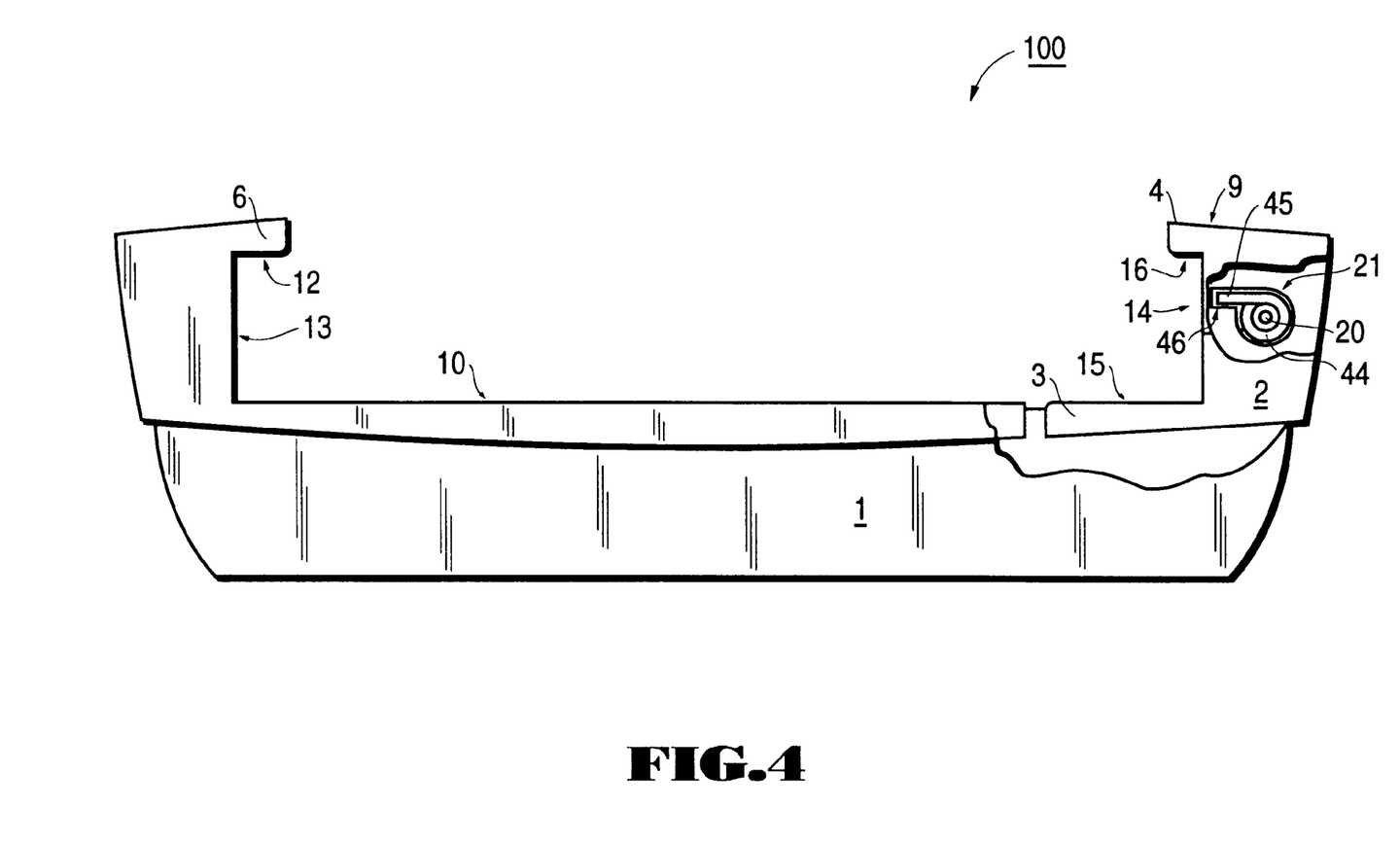
FIG. 4 is a side cut-away view of a cradle having a latch bar which is in the latched position in accordance with the present invention.

In the cut-away view of FIG. 4 it can be seen that latch bar 2 includes pivot opening 21 which extends through latch bar 2. Cradle 100 also includes a spring mechanism having a spring 44 for biasing latch bar 2 in the released position. Spring 44 is disposed around pivot pin 20. Both pivot pin 20 and spring 44 are disposed within pivot opening 21. In one embodiment, spring 44 is a torsion spring which is wrapped around pivot pin 20. One end of spring 44, shown as end 45, fits within a recession 46 in the side of latch bar 2 so as to act on latch bar 2.

Figure 5:
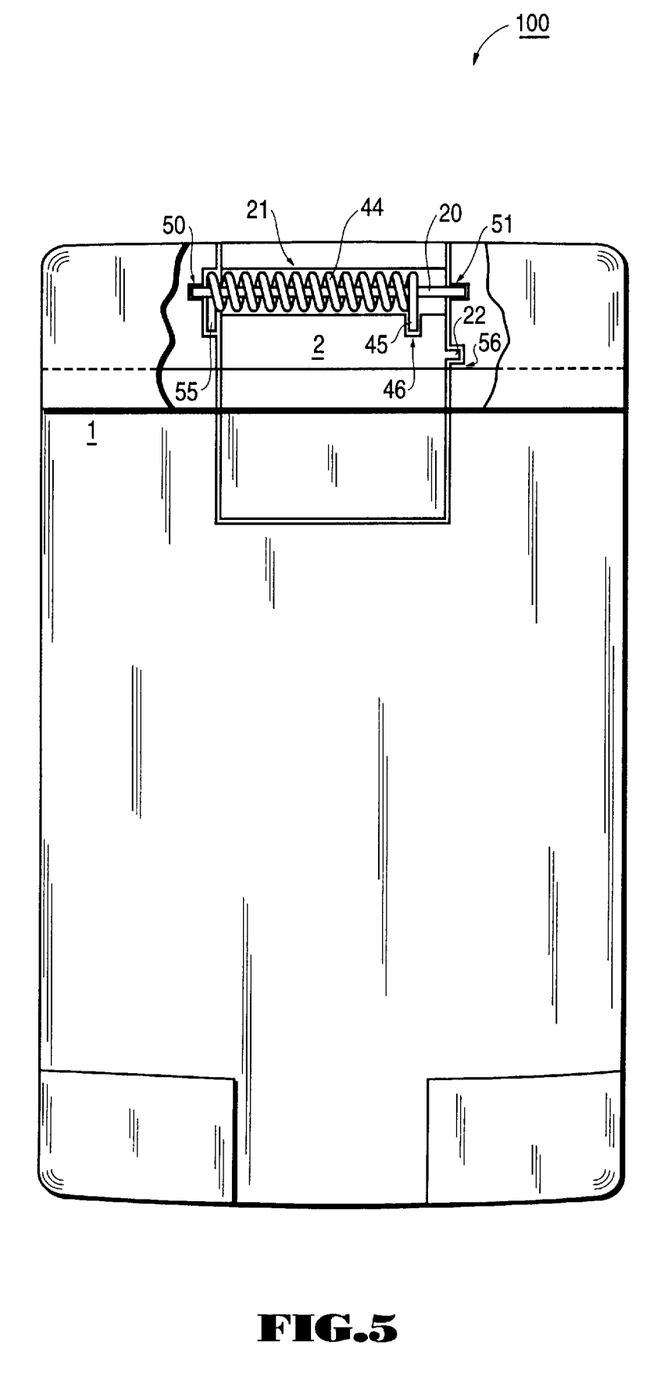
FIG. 5 is a top cut-away view showing a cradle having a latch bar which is in the latched position in accordance with the present invention.

With reference now to FIG. 5, housing 1 includes an opening 50 and an opening 51 adapted to receive pivot pin 20. Opening 50 also includes a recession adapted to receive a portion of spring 44. Spring 44 also includes end 55 which fits within the recession in opening 50 of housing 1 so as to act on latch bar 2.

With reference again to FIG. 5, in the present embodiment, the latching mechanism is shown to include detent 22 that extends from latch bar 2 and indentation 56 within housing 1. When latch bar 2 is in the latched position, detent 22 engages indentation 56 so as to hold latch bar 2 in the latched position. Although such a specific implementation of a spring mechanism is described above, the present invention is well suited to the use of various other biasing mechanisms. That is, the present invention is well suited to using other mechanisms which bias latch bar 2 to an unlatched/released position.

Figure 6:
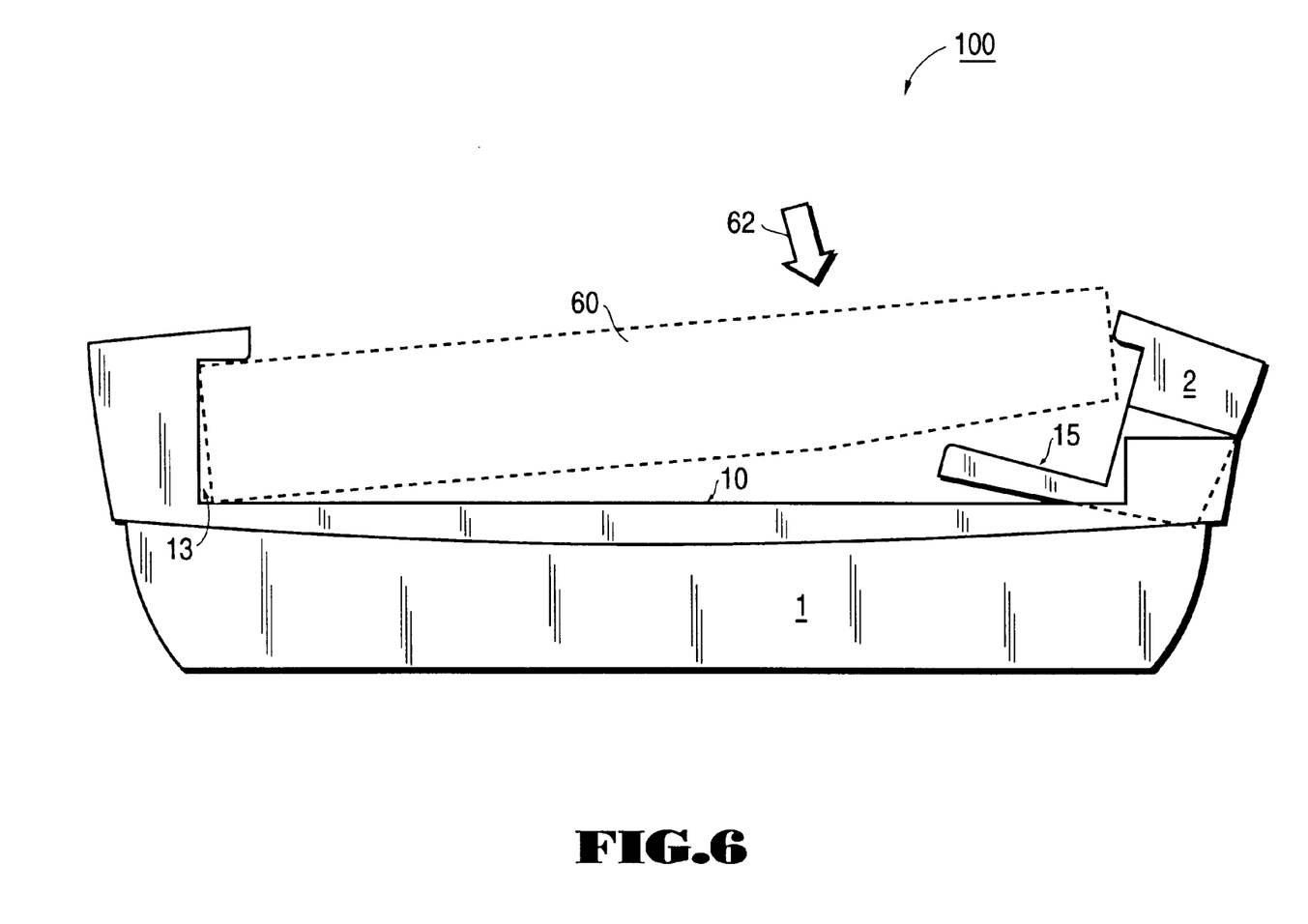
FIG. 6 is a side view of a telephone disposed in a cradle having a latch bar which is in the released position in accordance with the present invention.
Figure 7:
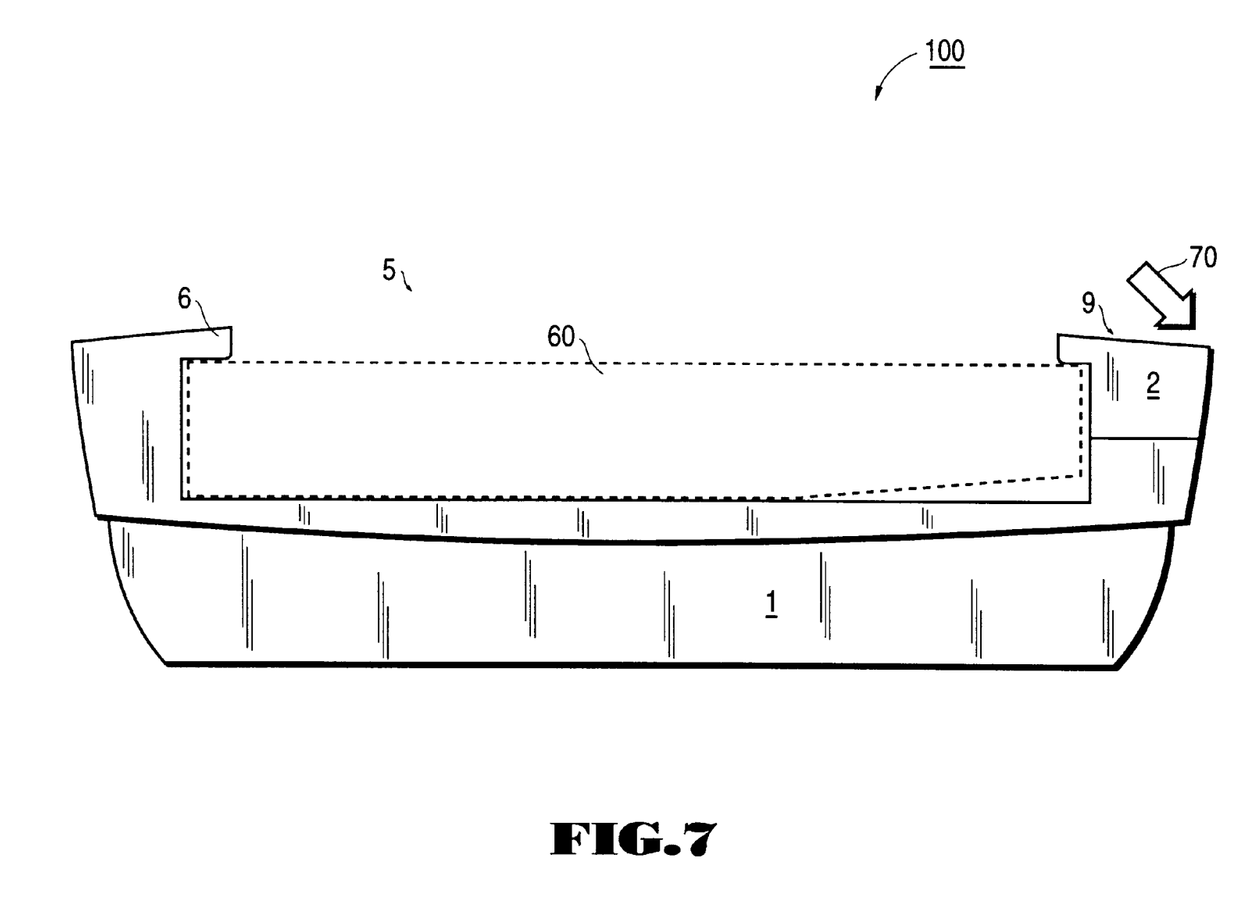
FIG. 7 is a side view of a telephone disposed in a cradle having a latch bar which is in the latched position in accordance with the present invention.

In operation, a telephone such as telephone 60 of FIG. 6 is placed into telephone cradle 100. The bottom end of telephone 60 is received by telephone receiving surface 13 and telephone receiving surface 10 while the upper end of telephone 60 rests against telephone receiving surface 15. Pressing down on telephone 60, as shown by arrow 62, applies force to telephone receiving surface 15 so as to pivot latch bar 2. As latch bar 2 pivots, spring 44 of FIG. 4 is placed in tension. As latch bar 2 continues to pivot, the top of telephone 60 moves downward with the movement of latch bar 2 until such time as latch bar 2 reaches the latched position. In the latched position, the latching mechanism holds latch bar 2 in the latched position. As shown in FIG. 7, in the latched position, telephone 60 fits within cavity 5 of housing 1 such that it is securely held in place. More specifically, in the present embodiment, detent 22 engages indentation 56 of FIG. 5 so as to hold latch bar 2 in the latched position. In the latched position, telephone 60 is captured by surfaces 10–16. That is, the top surface of telephone 60 has surfaces 12 and 16 pressed against it. Surface 13 prevents telephone 60 from sliding backwards, and surfaces 11 and 14 prevent telephone 60 from sliding forward in cradle 100.

Telephone 60 is released by pressing on top surface 9 of latch bar 2 as shown by arrow 70 of FIG. 7. Top surface 9 of latch bar 2 is a large, relatively flat surface. Thus, it is easy for a user to locate or feel top surface 9, and it is easy for a user to press on top surface 9 using a single hand. This allows for easy one-handed operation of cradle 100.

With reference again to FIG. 7, when a user presses on top surface 9, force is applied to pivot bar 2 so as to release the latching mechanism. More particularly, detent 22 of FIG. 5 is disengaged from indentation 56. Once the latching mechanism is released pivot bar 2 is free to pivot around pivot pin 20. Latch bar 2 then automatically pivots as a result of the force applied by spring 44 of FIG. 4, moving the top of telephone 60 upward and away from telephone receiving surface 10 until such time as latch bar 2 returns to the released position. Moreover, in the present invention, once a user locates cradle 100, the user simply slides his hand forward along the top surface of telephone 60 and cradle 100. Once the user's hand reaches latch bar 2, the user then pushes on latch bar 2 so as to rotate latch bar 2, as indicated by arrow 70. In so doing, latch bar 60 is biased to its released position. Extending member 3 of latch bar 2 then lifts telephone 60 into the hand of the user. Thus, with a forward thrust of a single hand, the user has telephone 60 pushed into his hand. Hence, the present invention allows a user to retrieve telephone 60 without requiring the user to look at the cradle, concentrate on complicated de-latching devices, or use two hands to operate the cradle.

With reference again to FIG. 6, when the latch bar 2 is in the released position, telephone 60 is at an angle relative to telephone receiving surface 10 and is separated from telephone receiving surface 10 such that a user may easily grasp telephone 60. More specifically, the space between the bottom of telephone 60 and telephone receiving surface 10 allows a user to reach under telephone 60 such that telephone 60 is readily and easily grasped.

Figure 8:
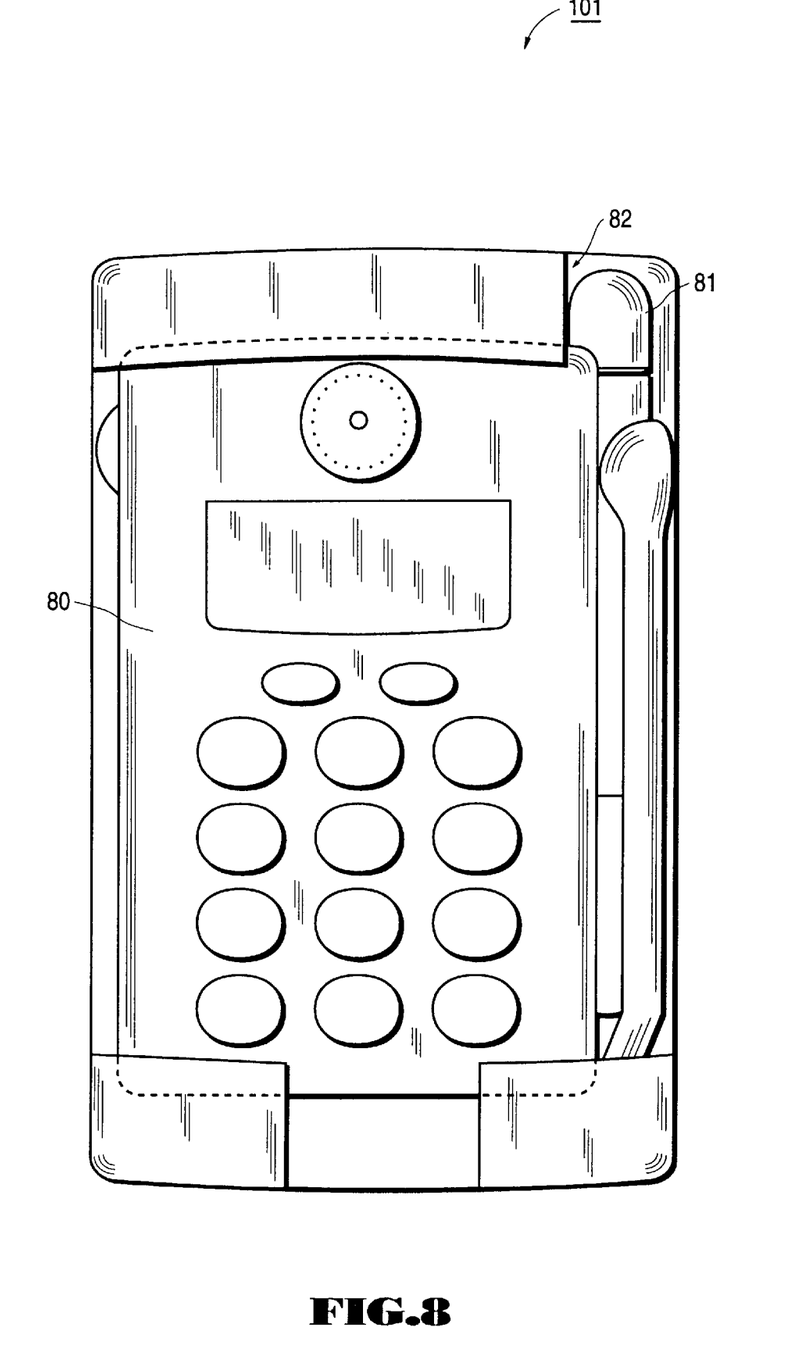
FIG. 8 is a top view of a telephone having an antenna which projects from the telephone body, wherein the telephone is disposed in a cradle adapted to receive such a telephone in accordance with the present invention.

FIG. 8 shows a top view of an alternate embodiment in which telephone cradle 101 is adapted to receive a telephone 80 which includes an extended antenna 81. In this embodiment, telephone cradle 101 includes inset 82 which is adapted to receive antenna 81. Because inset 82 is located on one side of housing 1, it does not interfere with the operation of telephone cradle 101.

In addition to use with cellular telephones, the telephone cradle of the present invention is well suited for use with handheld units used in satellite communication networks and other types of communication networks. For example, the telephone cradle of the present invention is adapted to hold a satellite telephone. In addition, the telephone cradle of the present invention is well adapted for receiving non-cellular radio-telephones.

The cradle of the present invention is also well suited for use with alternate types of spring mechanisms and latching mechanisms. For example, the present invention is well adapted for use with a latching mechanism which is a push-push latch. In addition, any of a number of different spring mechanisms which provide torque to latch bar 2 may be used to move latch bar 2 from the latched position into the released position.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, to thereby enable others skilled in the art best to utilize the invention and various embodiments with various modifications as are suited to the particular use contemplated. It is intended that the scope of the invention be defined by the claims appended hereto and their equivalents.

I claim:

1. A cradle for a telephone comprising:

a housing;

a latch bar including a top surface, said latch bar pivotally coupled to said housing such that said latch bar is movable from a latched position to a released position upon the application of force to said top surface, said latch bar including an extending member and a projecting member adapted to receive a telephone therebetween, said extending member moving said telephone upwards as said latch bar moves from said latched position to said released position such that said telephone is easily grasped; and a biasing mechanism coupled to said latch bar, said biasing mechanism adapted to selectively adjust the position of said latch bar to secure a telephone in either said latched position or in said released position.

2. The cradle for a telephone of claim 1 wherein said housing includes a cavity adapted to receive said telephone and a ledge on one end of said cavity for securely holding one end of said telephone when said telephone is disposed in said cavity.

3. The cradle for a telephone of claim 2 wherein said latch bar is coupled to said biasing mechanism such that the application of downward force to said extending member moves said latch bar into said latched position.

4. The cradle for a telephone of claim 1 wherein said latch bar further comprises a detent adapted to couple to a corresponding notch disposed in said housing.

5. The cradle for a telephone of claim 1 wherein said biasing mechanism further comprises a torsion spring coupled to said latch bar.

6. The cradle for a telephone of claim 5 wherein said housing has a first pivot opening disposed therein and wherein said latch bar includes a second pivot opening disposed therein, said cradle further comprising:

a pivot pin disposed within said first pivot opening and within said second pivot opening so as to pivotally couple said latch bar to said housing.

7. The cradle for a telephone of claim 6 wherein said torsion spring is disposed around said pivot pin such that said torsion spring acts on said latch bar and said housing so as to bias said latch bar in the open position.

8. A cradle for a telephone comprising:

a housing;

securing means for containing a telephone, said securing means having a top surface, said securing means pivotally coupled to said housing such that said securing means is movable from a latched position to a released position upon the application of force to said top surface, said securing means including an extending member and a projecting member adapted to receive a telephone therebetween, said extending member moving said telephone upwards as said securing means moves from said latched position to said released position such that said telephone is easily grasped; and biasing means for selectively adjusting the position of said securing means to place said telephone in either said latched position or said released position, said biasing means coupled to said securing means.

9. The cradle for a telephone of claim 8 wherein said securing means further comprises a latch bar and wherein said biasing means further comprises a spring mechanism for biasing said latch bar.

10. The cradle for a telephone of claim 9 wherein said housing includes a cavity for receiving said telephone.

11. The cradle for a telephone of claim 8 wherein, upon the placement of said telephone into said cradle such that a downward force is applied to said extending member, said securing means moves into the latched position so as to capture said telephone within said cradle.

12. A method for releasing a telephone disposed within a telephone cradle which includes a housing, said method comprising the steps of:

a) providing a latch bar having a top surface and an extending member, said latch bar pivotally coupled to said housing such that said latch bar is movable from a latched position to a released position;

b) providing biasing means for selectively adjusting the position of said latch bar to secure said telephone in either said latched position or said released position; and c) applying force to said top surface when said latch bar is in said latched position so as to pivot said latch bar into said released position, said extending member moving said telephone upwards as said latch bar moves from said latched position to said released position such that said telephone is easily grasped.

* * * * *

UNITED STATES PATENT AND TRADEMARK OFFICE
CERTIFICATE OF CORRECTION

PATENT NO : 6,002,765
DATED : DEC. 14, 1999
INVENTOR(S) : CHRISTOPHER L. FRANK

It is certified that error appears in the above-identified patent and that said Letters Patent is hereby corrected as shown below:

On the title page, item [75] should read--

Christopher L. Frank, Oakland, Calif.

Signed and Sealed this

Eleventh Day of July, 2000

Attest:

Q. TODD DICKINSON

*Attesting Officer*      *Director of Patents and Trademarks*